R. W. KNAPP.
STARTING DEVICE FOR GAS ENGINES.
APPLICATION FILED MAR. 31, 1910.
1,142,889.
Patented June 15, 1915.
3 SHEETS—SHEET 1.
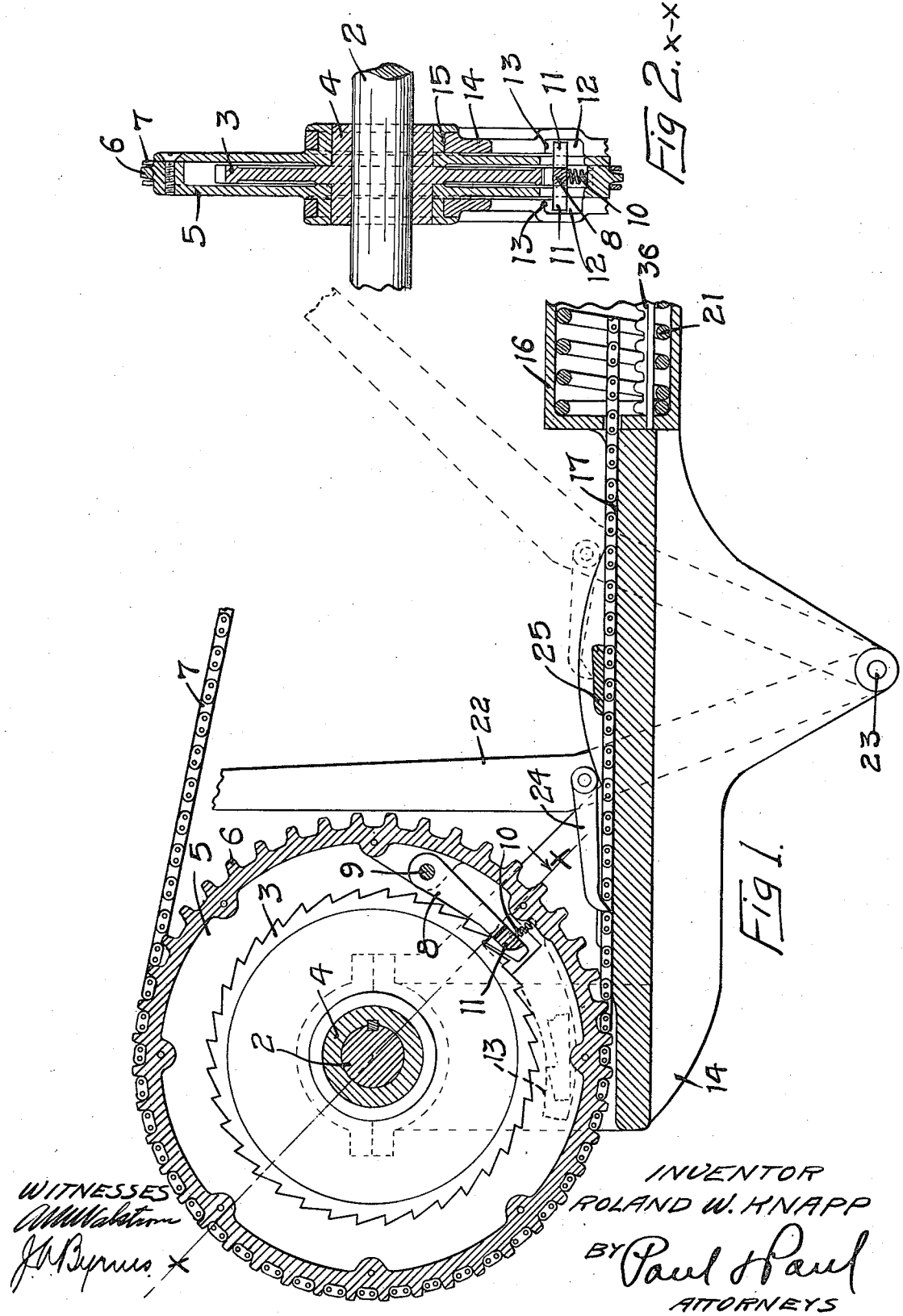

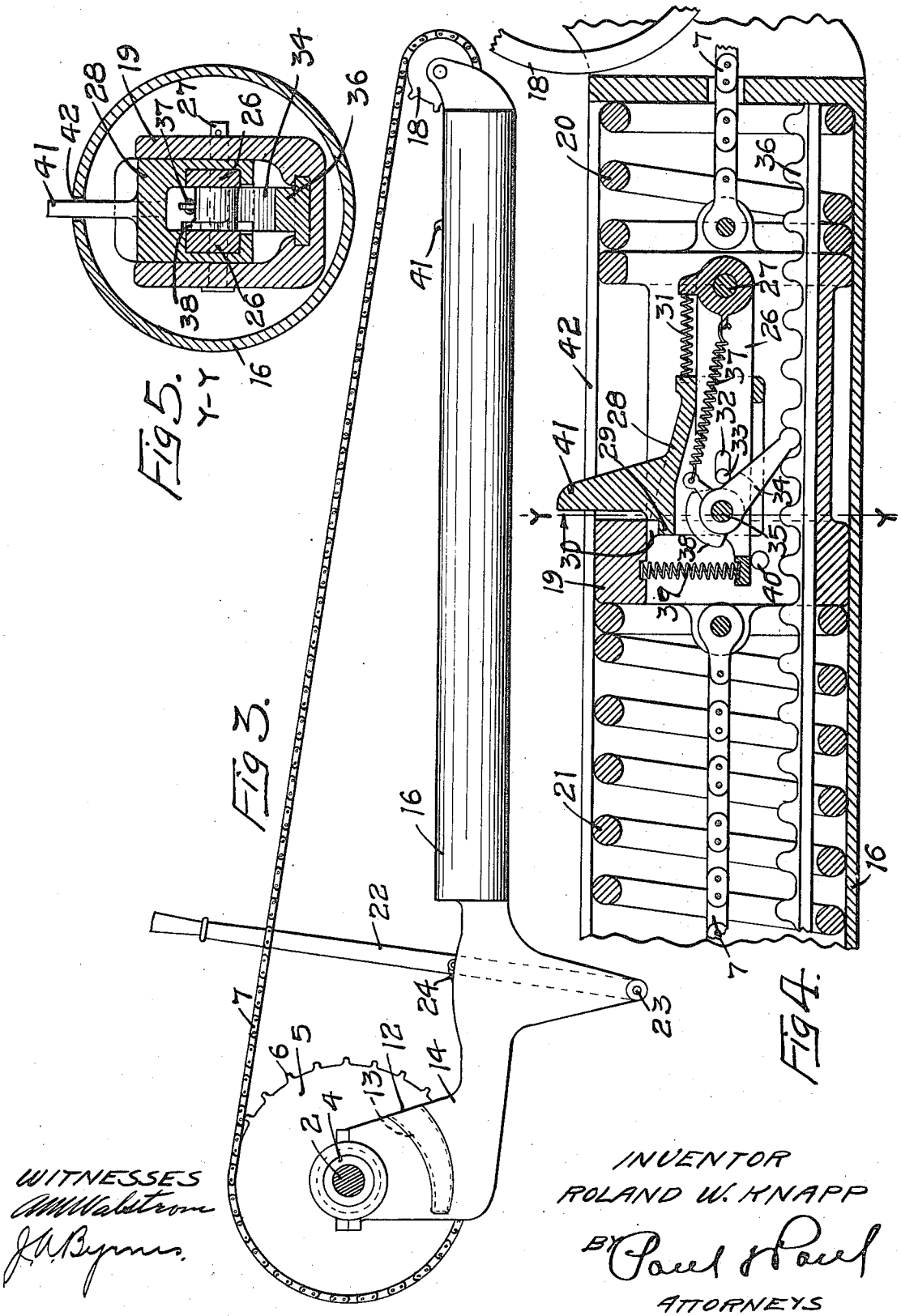

R. W. KNAPP.
STARTING DEVICE FOR GAS ENGINES.
APPLICATION FILED MAR. 31, 1910.

1,142,889.

Patented June 15, 1915.
3 SHEETS—SHEET 3.

WITNESSES
AMWakstrom
JCByrnes

INVENTOR
ROLAND W. KNAPP
BY Paul & Paul
ATTORNEYS

UNITED STATES PATENT OFFICE.

ROLAND WELTON KNAPP, OF MINNEAPOLIS, MINNESOTA.

STARTING DEVICE FOR GAS-ENGINES.

1,142,889.  Specification of Letters Patent. Patented June 15, 1915.

Application filed March 31, 1910. Serial No. 552,658.

*To all whom it may concern:*

Be it known that I, ROLAND W. KNAPP, of Minneapolis, Hennepin county, Minnesota, have invented certain new and useful Improvements in Starting Devices for Gas-Engines, of which the following is a specification.

The object of my invention is to provide a device for starting a gas engine by means of which the engine shaft can be revolved easily and quickly without danger to the operator.

A further object is to provide a mechanism adapted particularly for large engines where generally the strength of several men is required to start the engine.

The invention consists generally in a step by step mechanism for putting the spring under compression to revolve the engine shaft.

Further the invention consists in various constructions and combinations, all as hereinafter described and particularly pointed out in the claims.

Figure 6:
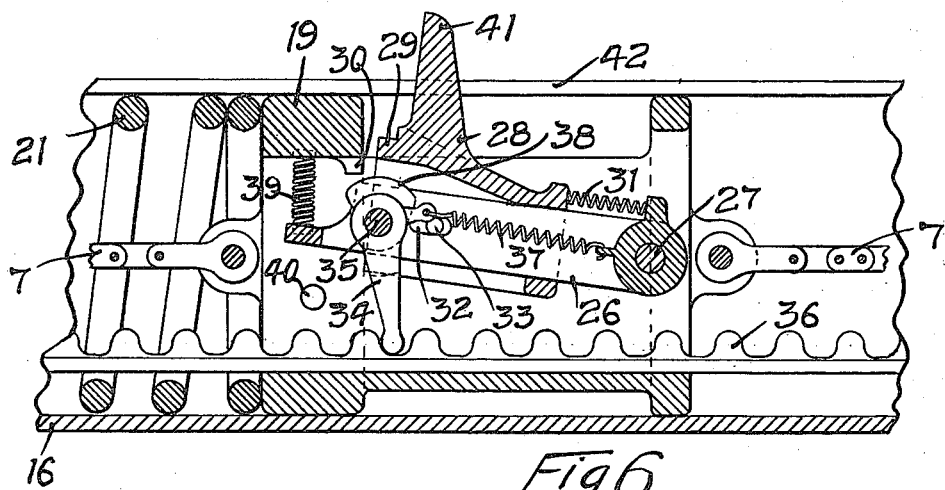
Figure 7:
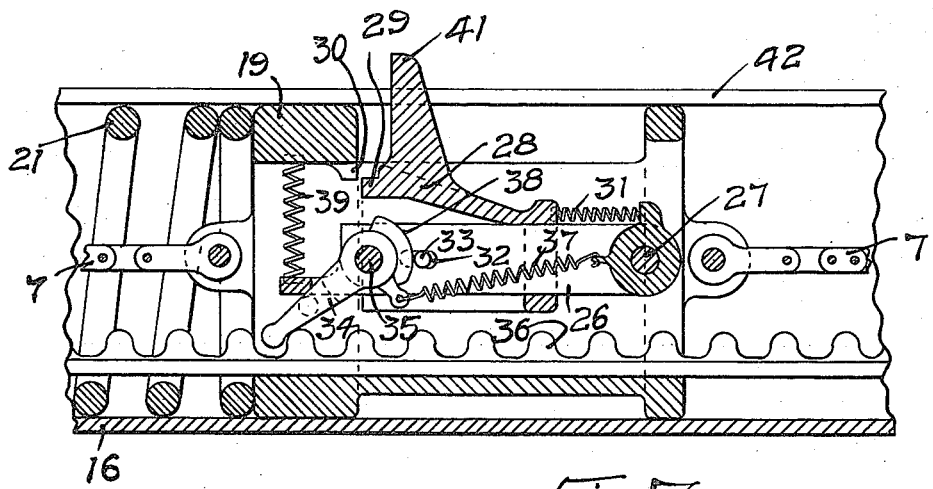

In the accompanying drawings forming part of this specification, Figure 1 is a sectional view illustrating the application of my invention to a shaft, Fig. 2 is a sectional view on the line $x$—$x$ of Fig. 1, Fig. 3 is a side elevation of the device, Fig. 4 is a detail sectional view illustrating the construction of the locking mechanism and showing it in its locked position, Fig. 5 is a transverse, sectional view on the line $y$—$y$ of Fig. 4, Fig. 6 is a detail sectional view illustrating the locking mechanism partially released or unlocked, Fig. 7 is a similar view showing the locking mechanism unlocked or released.

In the drawing, 2 represents a shaft, which may be the shaft of an engine or a counter shaft suitably geared to the engine shaft, and 3 is a ratchet wheel having peripheral teeth and a hub 4 that is keyed to the shaft 2. Any other suitable clutch device may be employed in place of the ratchet wheel and its connections. A casing 5 is loosely mounted on the hub 4 inclosing the ratchet wheel and is provided with peripheral sprocket teeth 6 around which a sprocket chain 7 passes. Any other suitable driving connection may be employed in place of the sprocket chain 7. A dog 8 is pivoted at 9 within the casing 5 and is pressed toward the teeth of the ratchet wheel by a spring 10. Pins or projections 11 are provided on each side of the dog to enter recesses 12 having cam surfaces 13 in a bracket 14 and these cam surfaces engaging the pins 11 force the dog out of engagement with the teeth of the ratchet wheel when the casing is moved in one direction, the dog assuming the position indicated by dotted lines in Fig. 1. The bracket 14 is suitably supported on the frame of the engine. The dog will then be out of engagement with the ratchet teeth and will remain in this position until the operator wishes to start the engine. The bracket 14 has bearings 15 for the casing 5 and a cylinder 16, or other suitable guide, is provided at one end of said bracket wherein the locking mechanism, which I will now proceed to describe in detail, is arranged. The sprocket chain slides over a flat surface 17, formed preferably on said bracket, and passes around a sprocket wheel 18 mounted at the opposite end of the cylinder 16. Within the cylinder is a plunger 19, a buffer spring 20 at one end thereof and a spring 21 at the opposite end. The sprocket chain has one end attached to one end of the plunger and its other end to the opposite end of the plunger, so that when the sprocket chain is operated, the plunger will be reciprocated in said cylinder. The spring 21 is put under compression by means of a lever 22 pivoted at 23 and having a dog 24 which engages the links of the sprocket chain 7 so that when the lever is moved forward and backward, the sprocket chain may be pulled toward the left to compress the spring 21. At the end of the backward stroke of the lever 22, a bar 25 engages the dog and lifts it out of engagement with the links of the sprocket chain to render the dog inoperative.

For the purpose of locking the plunger and maintaining the compression of the spring 21 on the backward stroke of the lever 22, I provide arms 26 (see Fig. 5) pivoted at 27 within the plunger 19 and carrying a locking slide 28 having a lug 29 which is held in engagement normally with a shoulder 30 on the plunger by means of a compression spring 21. (See Fig. 4) The arms 26 have slots 32 in which a pin 33, mounted on the slide 28, is adapted to slide. Said arms also carry a dog 34 pivoted at 35 and adapted to engage the teeth of a rack bar 36 and held in contact therewith by a spring 37. The spring 37 is located, preferably, between the pivot of the dog 34 and the arm 26, its tension operating to hold the dog in engagement with the teeth of the rack bar. A cam 38 is mounted on said dog in position to engage the pin 33. The cam 38, engaging the pin 33, holds the slide in its inoperative position and prevents it from returning to its locking position until the dog 34 is swung past the center of its pivot and is in position to lock the plunger at every step of its movement toward the left of the cylinder or guide. When the plunger is moved toward the left by the stress on the chain 7, the dog 34 will slide over the teeth of the rack bar and hold the plunger positively against backward movement. In case of back fire in the engine and the backward revolution of the ratchet wheel, or revolution toward the right, in Fig. 1, power will be applied to the chain 7 through the dog 8 and the sprocket wheel to compress the spring 21 and put it wholly or partially under compression, so that it may only be necessary to trip the locking mechanism to start the engine. In the backward revolution of the ratchet wheel, due to back fire in the engine, in addition to the compression of the spring, as stated in the preceding sentence, the dog 8, through the projections 11 thereon and the cam surfaces 13, will be tripped and disengaged from the ratchet wheel and thereby prevent breakage of the parts and particularly the chain 7, which would follow in continued backward revolution of the engine shaft.

A compression spring 39 is interposed between the plunger and the free end of the arm 26. A pin 40, mounted in said plunger, limits the downward movement of said arm and slide. The spring 39 operates to hold the tilting arms 26 downwardly with a yielding pressure upon the pin 40 and keep the dog 34 in position to engage the teeth of the rack bar. A lug 41 projects upwardly from the slide 28 through a slot 42 in the cylinder 16 and this lug may be engaged by any suitable device to move the slide toward the pivot of the arm 26 and disengage the lug 29 from the shoulder 30.

Assuming that the parts are in the position indicated in Fig. 7, if the plunger is moved toward the left by the operation of the lever 22, the dog 34 will be rotated on its pivot and will gradually swing to the position shown in Fig. 4 where it will serve as a lock to prevent backward movement of the plunger in the cylinder until such time as the lug 41 is actuated to release the slide and permit the spring 21 to return the plunger toward the right hand end of the cylinder. The spring will be of sufficient strength so that when put under compression its release will develop energy sufficient to revolve the engine shaft and start the engine. It will only be necesssary, therefore, in operating the device to operate the lever 22 and put the spring 21 under compression until the dog 8 is disengaged from the teeth of the ratchet, where it will be held during the operation of the engine. When it is desired to start the engine again, after stopping, the lug 41 may be moved by the foot or a suitable mechanism to disengage the lug 29 on the slide 28 from the shoulder 30, thereby allowing the slide and arms 26 to swing upwardly to the positions indicated in Figs. 6 and 7, whereupon the plunger will be released and the power of the spring 21 will force the plunger toward the right and pull on the chain 7 to revolve the casing 5 toward the left and through the dog 8 actuate the ratchet wheel 3 and the shaft 2. The lever 22, after the spring 21 has been put under compression and the plunger locked, will be set in the position indicated in the dotted lines in Fig. 1, where it will not in any way interfere with the movement of the sprocket chain.

This apparatus, while capable of use with any type of explosion engine, is designed particularly for those used in heavy work where a number of men would be required to turn the shaft until the engine is started.

I have shown this starting mechanism adapted for use in connection with a compression spring, but it may also be used with a spring that is expanded to obtain the desired tension. I do not, therefore, wish to be confined to the form of spring illustrated herein or the details of construction, as in various ways they may be modified by any one skilled in this art.

I claim as my invention:—

1. The combination, with an explosion engine shaft, of a plunger having a driving connection with said shaft, a spring arranged to be put under tension by the movement of said plunger in one direction, a step by step mechanism for operating said plunger, means for locking said plunger at each successive step, and means for tripping said locking means.

2. The combination, with an explosion engine shaft, of a plunger having a driving connection with said shaft, a spring arranged to be put under tension by the movement of said plunger in one direction, means for moving said plunger to set said spring, means for locking said plunger at any point in its movement, and means for tripping said locking means.

3. The combination, with an explosion engine shaft, of a plunger having a driving connection with said shaft, a spring arranged to be put under tension by the movement of said plunger in one direction, means for moving said plunger to set said spring, means for locking said plunger at any point in its stroke, said locking means comprising a rack bar, a spring pressed tilting frame, a spring pressed dog carried by said frame and adapted to engage the teeth of said rack bar, and means preventing the premature disengagement of said dog from said teeth.

4. The combination, with an explosion engine shaft, of a plunger having a clutch connection with said shaft, a spring arranged to be put under tension by the movement of said plunger in one direction, means for moving said plunger to set said spring, a locking mechanism for holding said plunger at any point in its stroke, said locking mechanism including a tilting frame, a rack bar, a dog carried by said frame and adapted to engage the teeth of said rack bar, and means slidably mounted on said frame and adapted to hold said dog in engagement with the teeth of said bar or allow said frame to tilt and permit the disengagement of said dog from said bar.

5. The combination, with an explosion engine shaft, of a plunger having a driving connection with said shaft, a cylinder for said plunger, a spring arranged to be put under compression by the movement of said plunger in one direction, a rack bar mounted in said cylinder, means for moving said plunger to compress said spring, a locking mechanism carried by said plunger and having a dog to engage the teeth of said rack bar and lock said plunger at any point in its stroke, and means for tripping said dog to release said plunger.

6. The combination, with an explosion engine shaft, of a plunger having a driving connection with said shaft, a cylinder for said plunger, a spring arranged to be put under compression by the movement of said plunger in one direction, means for moving said plunger to compress said spring, a rack bar provided in said cylinder, a tilting frame carried by said plunger, a dog mounted in said frame and adapted to engage the teeth of said rack bar, a spring pressed slide mounted on said frame and having a lug to engage said plunger and lock said frame against premature tilting, said slide having a pin projecting into the path of said dog to be actuated thereby and hold said slide in its inoperative position when said dog is in its released position.

7. A starting device for gas engines comprising a cylinder, a plunger therein, a spring arranged to be put under tension by the movement of said plunger in one direction, a flexible connection attached to said plunger and having means for connection with a gas engine shaft, a step by step device for moving said plunger to set said spring, means for locking said plunger at any point in its setting movement and means for tripping said locking mechanism to release said plunger.

8. The combination, with an explosion engine shaft, of a gear having a clutch connection therewith and free to move in one direction but locked by said clutch against independent movement in the other direction, a cylinder, a spring therein, a plunger having means for connection with said gear and adapted, when moved in one direction, to put said spring under tension, a rack bar provided in said cylinder, a dog carried by said plunger and adapted to engage the teeth of said rack bar, and means for tripping said dog to release said spring and plunger.

9. A starting device for gas engines comprising a loosely mounted sprocket wheel, an engine shaft having a ratchet connection with said wheel, a cylinder, a plunger therein, a sprocket chain passing around said wheel and attached at its ends to said plunger, a spring put under compression by the movement of said plunger in one direction, means for temporarily locking said plunger at any point in its compressing movement, and means for tripping said locking means to release said spring and plunger.

10. The combination, with an explosion engine shaft, of a loosely mounted sprocket wheel having a clutch connection with said shaft, a cylinder, a plunger therein, a sprocket chain engaging said wheel and having its ends attached to said plunger, a spring put under compression by the movement of said plunger, a step by step device for operating said plunger, means for locking said plunger, and a releasing device.

11. A starting device for gas engines comprising a loosely mounted sprocket wheel, an engine shaft having a clutch connection with said wheel, a sprocket chain engaging said wheel, a spring arranged to be put under tension by the movement of said chain in one direction, a step by step device for actuating said chain, a locking device, and a tripping means.

12. The combination, with an explosion engine shaft, of means having a driving connection with said shaft, a lever mechanism having a step by step movement for operating said means, a spring arranged to be put under tension by the movement of said means, a device for holding said spring under tension at each step of said lever mechanism, and means for tripping said holding device.

13. The combination, with an explosion engine shaft, of a member having a driving connection with said shaft, yielding means arranged to be put under tension by the movement of said member in one direction, a device having a step by step movement for operating said member, means for holding said yielding means under tension at each step of said member operating device, and means for tripping said holding device.

In witness whereof, I have hereunto set my hand this 19th day of March 1910.

ROLAND WELTON KNAPP.

Witnesses:
L. C. CRONEN,
G. E. SORENSEN.